United States Patent [19]
Campbell

[11] 3,993,184
[45] Nov. 23, 1976

[54] CABLE CONVEYOR

[75] Inventor: David R. Campbell, Salt Lake City, Utah

[73] Assignee: Cambelt International Corporation, Salt Lake City, Utah

[22] Filed: May 22, 1975

[21] Appl. No.: 579,774

Related U.S. Application Data

[63] Continuation of Ser. No. 436,077, Jan. 24, 1974, abandoned.

[52] U.S. Cl. .............................. 198/533; 198/546; 198/615; 302/11; 198/716
[51] Int. Cl.[2] .................. B65G 47/18; B65G 19/16
[58] Field of Search ...................... 302/5, 8, 11–13, 302/37, 56; 198/54, 55, 62, 130, 168, 128, 171

[56] References Cited
UNITED STATES PATENTS

| | | | |
|---|---|---|---|
| 2,738,765 | 3/1956 | Hart | 198/168 |
| 2,756,866 | 7/1956 | Wilde | 198/168 |
| 2,995,109 | 8/1961 | Cordis | 198/168 |
| 3,003,464 | 10/1961 | Bailey | 198/168 |
| 3,580,641 | 5/1971 | Schloss | 302/12 |
| 3,687,272 | 8/1972 | Eisenegger | 198/168 |

Primary Examiner—Evon C. Blunk
Assistant Examiner—Jeffrey V. Nase
Attorney, Agent, or Firm—K. S. Cornaby

[57] ABSTRACT

A closed conveyor for transporting finely divided solids, such as grain and the like, comprising feed and discharge sections interconnected by a transport conduit and a return conduit. Sprockets are provided in the feed and discharge sections and a cable is trained about the sprockets and through the two conduits. The cable is equipped with material-engaging flights of area less than the cross-section of the conduit. Each sprocket is provided with material-engaging blades which serve to stir, fluidize and impart movement to the material being transported to render it as a fast-flowing dilute suspension. Lugs are provided on the cable between the flights and are positioned to be engaged by complemental lug-engaging elements on the sprockets. Each pair of lug-engaging elements on the sprockets fits between but in contact with a pair of lugs on the cable. The sprocket elements are notched to accept the cable lugs. By fitting between cable lugs, the sprocket elements restrain the cable from overrun and thus prevent direct contact between the cable and sprocket. Means are provided for driving the sprockets at high speed to fluidize and accelerate the material in the feed section. Alternate structures are disclosed which employ intermediate booster sections between the feed and discharge sections wherein refluidization and accelerations occur and/or the direction of transport may be changed.

9 Claims, 7 Drawing Figures

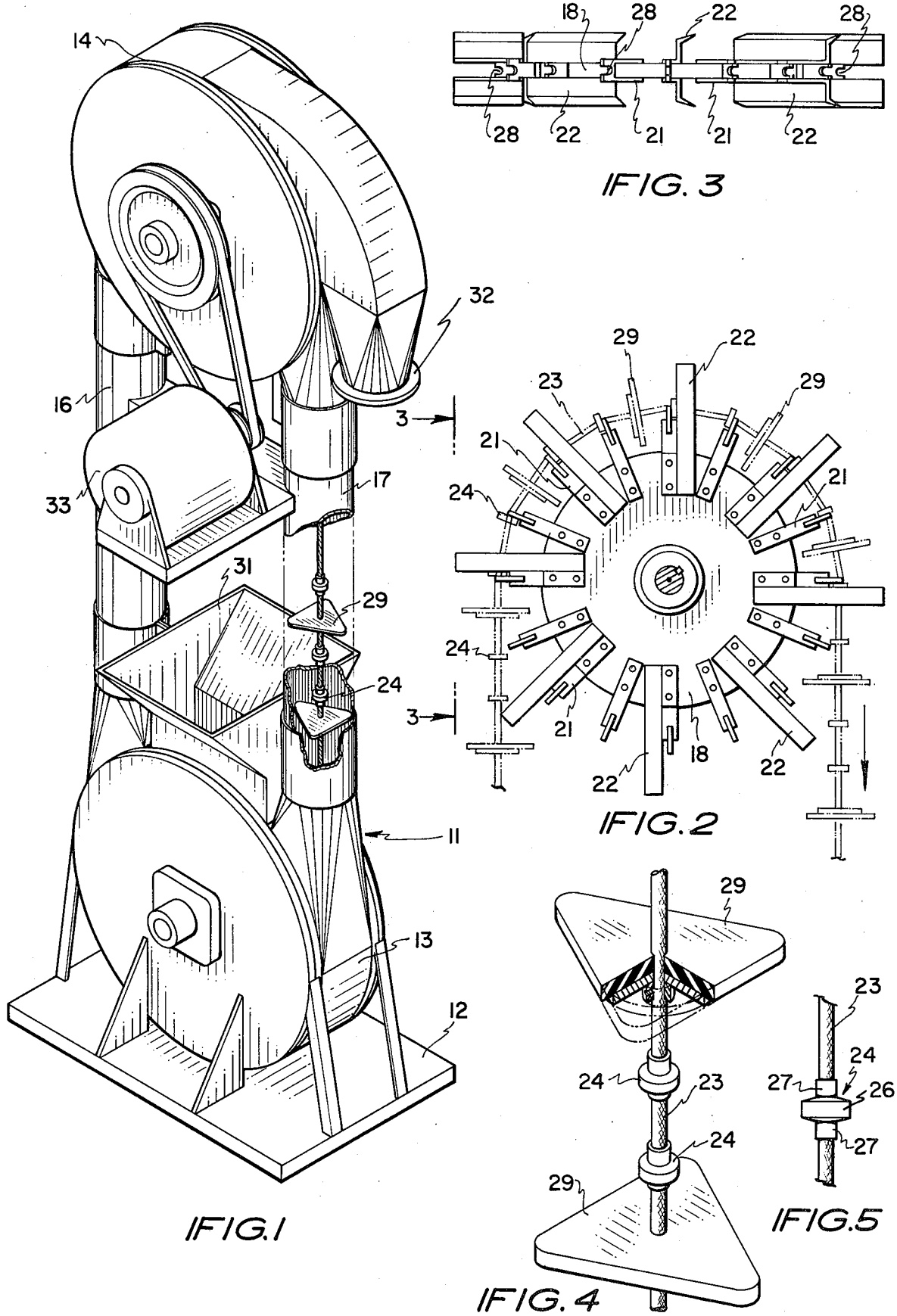

CABLE CONVEYOR

This application is a continuation of co-pending application Ser. No. 436,077, filed Jan. 24, 1974, now abandoned.

BACKGROUND OF THE INVENTION

So-called cable conveyors currently and previously in use comprise a cable or chain trained about spaced-apart sprockets and through a closed conduit. Spaced flights or lugs are secured to the cable and the material to be moved is fed to the unit to be pushed through the conduit in a dense plug-flow manner. Customarily, these conveyors run at relatively low speed and have a correspondingly low capacity. Attempts to operate at high speeds have resulted in rapid wearing of the conduit walls due to friction of the material being transported and also to jamming of the material.

SUMMARY OF THE INVENTION

This invention relates to an improved cable conveyor for transporting fine material. According to the invention the conveyor is of a particular construction enabling high speed, high capacity transport of a finely divided material.

It is a primary object of this invention to provide ways and means for high speed conveying of material.

It is a further object to provide such a conveyor, and a method of conveying, in which friction is kept at a low level to the end that the wear in the conveyor is minimized yet high capacity transport is achieved.

Briefly, the conveyor of the invention comprises a conduit, a drive sprocket at one end thereof and an idler sprocket at the other end, spaced-apart material-engaging flights or plates on a cable trained about the sprockets and through the conduit, lugs on the cable at spaced intervals between the plates, lug-engaging elements on each of the sprockets and material-engaging blades at least on the drive sprocket for stirring and fluidizing the material and imparting motion thereto prior to its entry into the conduit; and drive means for rotating such sprockets and cable at a speed to fluidize and convey the material, the speed being such that the amount of material picked up by each passing sprocket blade is less than required to completely fill the conduit with a dense mass of material.

As used herein, the term fluidized means that the solids being transported are suspended as a relatively dilute mass in a fast-flowing air stream.

In the particular embodiment of the invention described herein, the material-engaging flights on the cable are of area less than the cross-sectional area of the conduit. This provides the necessary surface to move the dilute air-solids mixture through the conduits yet permits some slowing of material adjacent the conduit wall.

The lugs on the cable and the complemental lug-engaging elements on the sprockets are spaced so that each pair of lug-engaging elements contacts the cable between and in engagement with a corresponding pair of cable lugs. In other words, only alternate ones of the sprocket drive elements push the cable. The other elements in succession fit ahead of the next succeeding lug and thus engages its front side to prevent slippage of the cable in the event the sprocket stops. This is important because it insures that the only contact between the sprocket and cable is through the lug thus protecting the cable from damage due to direct contact with the rotating sprocket.

The speed of the conveyor as to both the cable and sprockets is important. It must be high enough to violently stir the material in the feed section to effect its fluidization and to accelerate the resulting dilute mass for transport through the conduit.

In order that the invention may be more readily understood and carried into effect, reference is made to the attached drawings and the following description which are offered for illustration only and not in limitation of the invention, the scope of which is defined by the appended claims and equivalents thereof.

BRIEF DESCRIPTION OF THE DRAWINGS

FIG. 1 is an isometric view of a conveyor constructed according to the invention, portions of the walls being cut away for clarity;

FIG. 2 is a side view of one of the sprockets employed in the conveyor illustrated in FIG. 1;

FIG. 3 is a side edge view of the sprocket shown in FIG. 2, the view being taken in the plane of line 3—3 of FIG. 2 looking in the direction of the arrows;

FIG. 4 is an isometric view of a portion of cable showing the material-engaging plates and the lugs;

FIG. 5 is a side view of a piece of cable illustrating the cable lugs.

DETAILED DESCRIPTION OF THE DRAWINGS

Figures 6, 7:
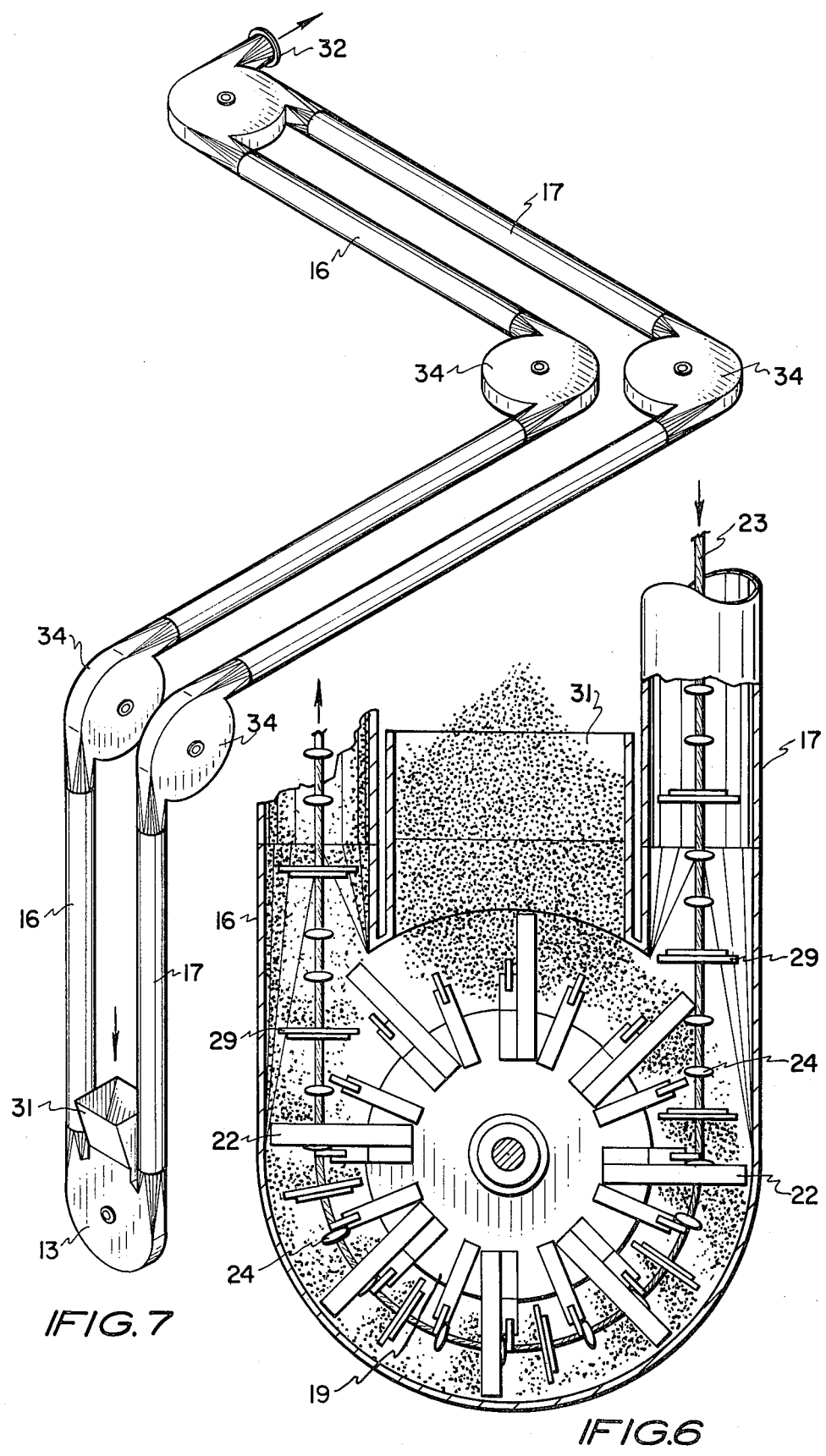
FIG. 6 is a cut-away view of a feed section and part of the conduits illustrating in more detail the fluidizing action of the blades.
FIG. 7 is an isometric view illustrating a multi-stage conveyor embodying the invention.

The conveyor 11 comprises a base 12, a feed section 13, an upper discharge section 14, a transport conduit 16 and a return conduit 17 extending between the feed and discharge sections; the conveyor further includes a drive sprocket 18 and an idler sprocket 19 mounted in the discharge and feed sections respectively.

Each of the sprockets is equipped with a plurality of radially extending lug-engaging elements 21 and a plurality of additional radially extending material-engaging blades or paddles 22 which are of width and length to extend substantially to the outer wall of the feed and discharge sections in which they are enclosed for rotation. The elements 21 and blades 22 are equally spaced angularly about the sprocket axis.

An endless cable 23 is trained about the two sprockets and through the conduits. To enable driving of the cable by the sprocket, the cable has fitted thereon a plurality of lugs 24, each of which has an enlarged center shoulder 26 with reduced neck portions 27 on opposite sides thereof. The neck protions 27 of the lugs are sized to fit into notches 28 on the drive elements 21 of the sprockets. Spacing of the cable lugs and the lug-engaging drive elements 21 is such that, as best shown in FIGS. 2 and 6, each successive pair of drive elements fits between a corresponding pair of cable lugs. The result is that the cable is restrained against movement relative to the sprocket hence moves only with the sprocket. This insures that the unprotected cable will not fall into the notches 28 where it might be damaged. Instead, the neck portions 27 of the cable lugs, which are much more wear-resistant than the cable, protect the cable against damage by the drive elements 21. The cable is also provided with a plurality of material-engaging flights 29. These are of an area less than the cross-sectional area of the conduit through which they pass. They do not carry or push a dense mass of material as is the case in the prior cable conveyors. Instead they keep a mass of air and a dilute suspension of solids moving through the tube thus aerating and maintaining an aspirating effect. In this connection, it should be noted that although the material is in effect moved along with and suspended in an air stream, the system does not require any introduction of pressured air as do pneumatic systems.

Both the feed and discharge sprockets are of the same configuration. As noted, the paddles 21 and 22 on the sprocket in the feed section serve to fluidize and accelerate the material supplied through the feed hopper 31. Also, as previously noted, the solids do not completely fill the feed enclosure because the sprocket rotates too fast to permit complete filling between the paddles 22 or plates 29. Thus, there is room for the material to expand into the dilute fluidized state in which it is transported. Although the density of the suspension may vary depending upon the material and operating conditions, it will not usually exceed about 60% of the density of the material at repose. In the discharge section, the corresponding blades engage the material and give it a final push for clean discharge via the outlet 32. The blades are of substantial area relative to the enclosures to insure maximum material movement.

In the illustrated embodiment, the upper sprocket is belt driven by a suitable motor 33. Drive speed is maintained high — in the approximate range of 200 to 1200 ft./min. linear speed on the cable — the speed being coordinated to the material being conveyed to achieve optimum operation. The motor effects rotation of the drive sprocket to drive the cable which in turn rotatably drives the one or more idler sprockets in the system.

In general, the minimum linear speed of the cable and sprocket is that needed to fluidize the material and initiate motion through the conduit. The maximum speed is that which produces the highest desired capacity at an economic expenditure of power. In this connection, the speed should be selected for the most economic operation in terms of material conveyed per horsepower expended. That is, after a certain speed and degree of material fluidization has been reached, higher speeds may not yield a proportionately higher capacity. There is no formula for determining the best speed for any given material, but it may be readily determined empirically.

The effect of fluidization is illustrated in FIG. 6 where the density of the material in its different states may be compared. As illustrated, the feed in the hopper 31 is in the normal dense state. As this material is fed into the feed enclosure and moves clockwise therearound, it expands to fill the enclosure due to the whipping or stirring action of the elements 21 and 22 on the sprocket as well as the flights 29 on the cable. As the fluidized or dilute suspension of material moves up the conduit, it stays in the dilute state except there is some densifying and slowing down of the material immediately adjacent the conduit wall. This wall effect, which has been observed through glass conduits, is beneficial because the relatively slower moving material adjacent the wall produces only a minimal abrasive effect.

Although the conveyor has been described with particular reference to transporting fine solids, it has also been employed to pump liquids.

In the illustrated embodiment, only a feed and discharge section are shown. the invention is not confined to such a limited design, but may employ several stages as illustrated in FIG. 7. Also, as shown in FIG. 7, it may be constructed to move material in a plurality of directions since all that is required to change direction is to train the cable around a properly positioned sprocket in a transition section. This will refluidize the material, give it an added boost and effect the change in direction.

The system illustrated in FIG. 7 comprises the same feed and discharge sections (13 and 14) as well as the transport and return conduits (16 and 17) as does the basic unit, but it is also equipped with two intermediate sections 34 each of which houses a fluidizing sprocket similar to that in the feed and discharge sections. In the configuration illustrated, the material moves vertically thence horizontally in one direction and finally laterally in another direction to eventual discharge.

I claim:
1. A conveyor adapted to convey particulate material, comprising in combination:
   a feed housing having a feed inlet for introducing particulate material into said housing;
   a discharge housing having an outlet for discharging particulate material therefrom;
   a pair of enclosed elongate conduits extending in parallel between and communicating with said feed housing and said discharge housing;
   a pair of sprocket means for rotating about an axis and mounted respectively in said discharge housing and said feed housing;
   endless cable means trained about both of said sprocket means and extending through both enclosing conduits;
   a plurality of spaced-apart material-engaging flights having a surface area less than the cross-sectional area of said enclosed conduits;
   a plurality of space-apart lug means attached to said cable means;
   a plurality of lug-engaging drive elements arranged in spaced-apart relationship and extending radially from the axis of each of said sprocket means;
   a plurality of material-engaging blade means arranged in spaced-apart relationships and extending radially from the axis of said sprocket means in said discharge housing for sweeping substantially the interior volume of said discharge housing as said sprocket means rotates about its axis; and
   drive means for driving said sprocket means and cable means at a speed sufficient to mechanically agitate and accellerate particulate material introduced into said feed housing and to mechanically agitate and accellerate said particulate material while passing said material through said conduit to said discharge housing and out of said discharge outlet.

2. A conveyor as set forth in claim 1, wherein a plurality of material-engaging blade means are arranged in spaced-apart relationship and extend radially from the axis of said sprocket means in said feed housing for sweeping substantially the interior volume of said feed housing as said sprocket means rotates about its axis.

3. A conveyor as set forth in claim 1, wherein said drive means moves said cable means and attached flights at such a linear speed that the density of the particulate material passing through said conduit does not exceed approximately 60% of the material at repose.

4. A conveyor as set forth in claim 1, wherein said drive means moves said cable means through said conduits at a speed of at least 200 feet per minute.

5. a conveyor as set forth in claim 1, wherein said lugs and said drive elements are spaced respectively such that a pair of drive elements fits between a pair of lugs with one of said drive elements in driving engagement with one of said lugs, and the other drive element in restraining engagement with the other of said lugs.

6. A conveyor as set forth in claim 1, wherein at least one intermediate housing is disposed between said feed housing and said discharge housing, said intermediate housing having sprocket means mounted therein for rotation about an axis, said sprocket means having a plurality of lug engaging drive elements and a plurality of material-engaging blade means arranged in spaced-apart relationship and extending radially from the axis of said sprocket means, said cable means being trained about said sprocket means in said intermediate housing, and said intermediate housing communicating with said feed and discharge housings respectively through enclosed conduits.

7. A conveyor as set forth in claim 6, wherein the axis of said sprocket means is at least one of said feed and discharge housings is transverse to the axis of the sprocket means in at least one of said intermediate housings.

8. A method for transporting particulate material through a conduit, comprising the steps of:
   introducing particulate material into a feed housing communicating with one end of an enclosed conduit;
   passing cable means having spaced-apart flights attached thereto through said feed housing and said conduit at sufficient linear speed to mechanically agitate and accellerate the particulate material as the particulate material is transported from the feed housing through the conduit by said cable means and flights; and
   receiving the agitated material at the opposite end of of said enclosed conduit in a discharge housing with rotational blade means engaging the agitated material passing from said conduit and throwing it from an outlet in said discharge housing.

9. A method as set forth in claim 8, including the step of pre-mixing and accellerating the particulate material in the feed housing prior to its introduction into said conduit.

* * * * *